Aug. 9, 1938.  W. V. RUSHLAU ET AL  2,126,506
CASING CLEANING AND FATTING MACHINE
Filed Aug. 1, 1936  4 Sheets-Sheet 1
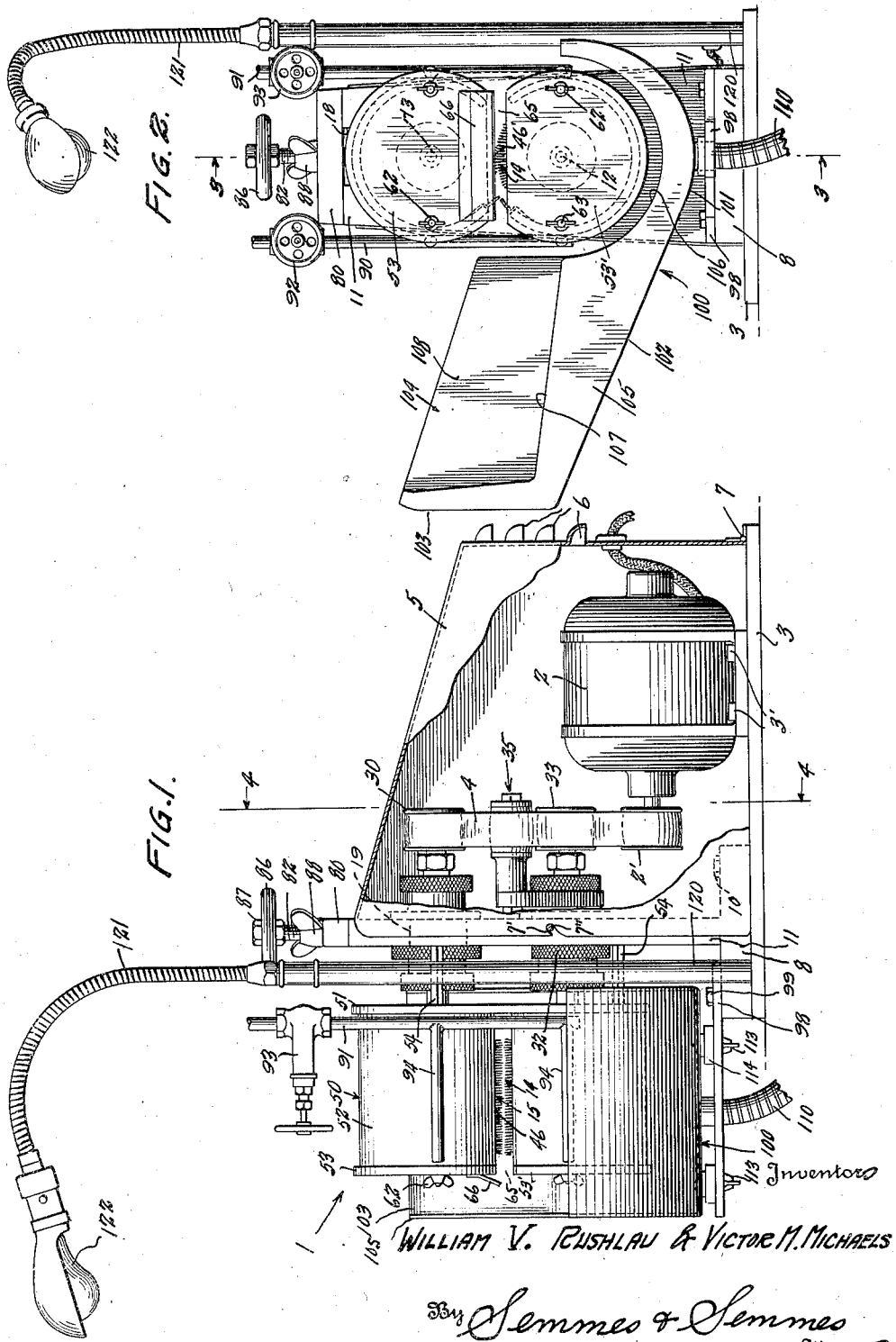
Inventors
WILLIAM V. RUSHLAU & VICTOR M. MICHAELS
By Semmes & Semmes
Attorneys

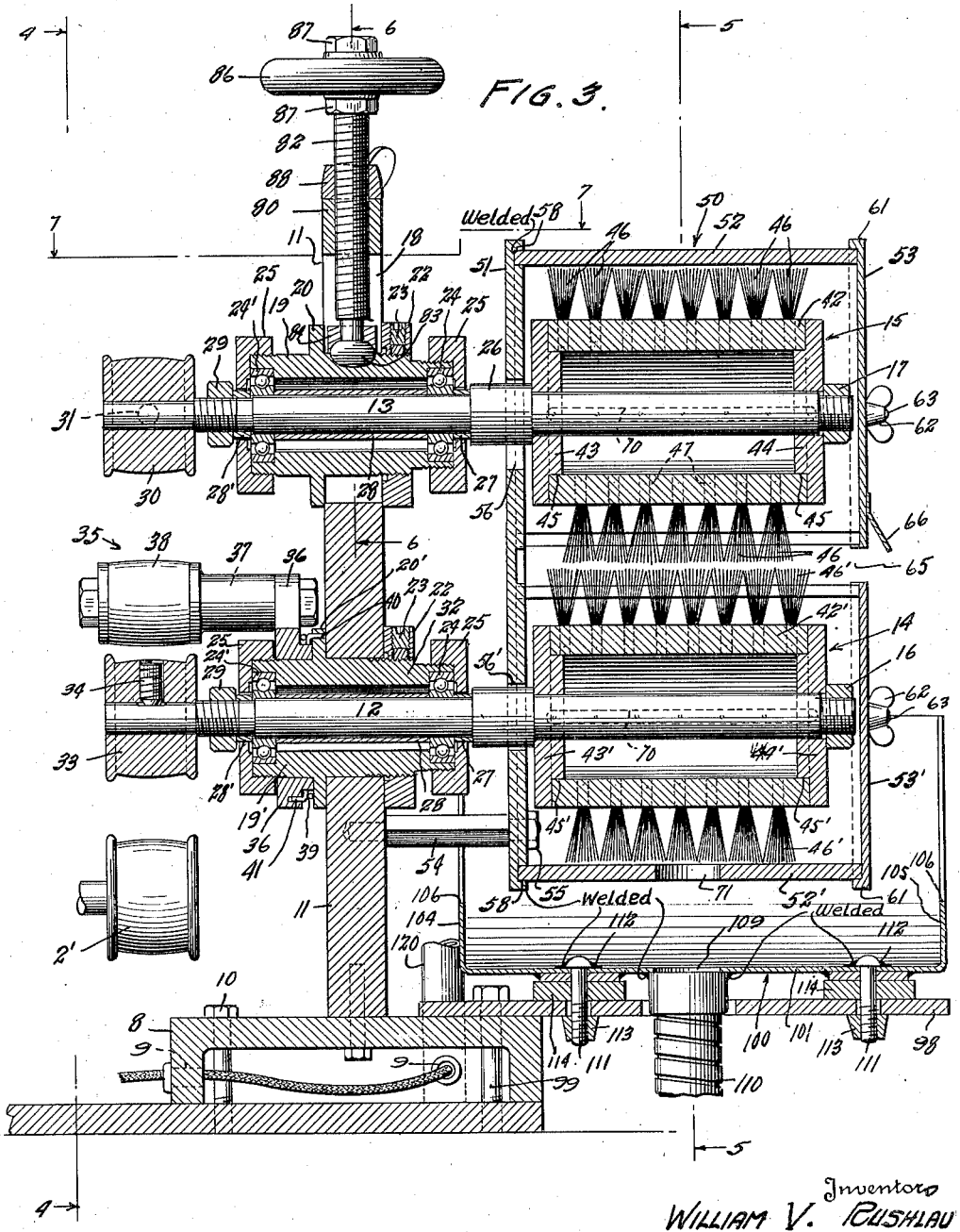

Aug. 9, 1938.  W. V. RUSHLAU ET AL  2,126,506
CASING CLEANING AND FATTING MACHINE
Filed Aug. 1, 1936  4 Sheets-Sheet 3
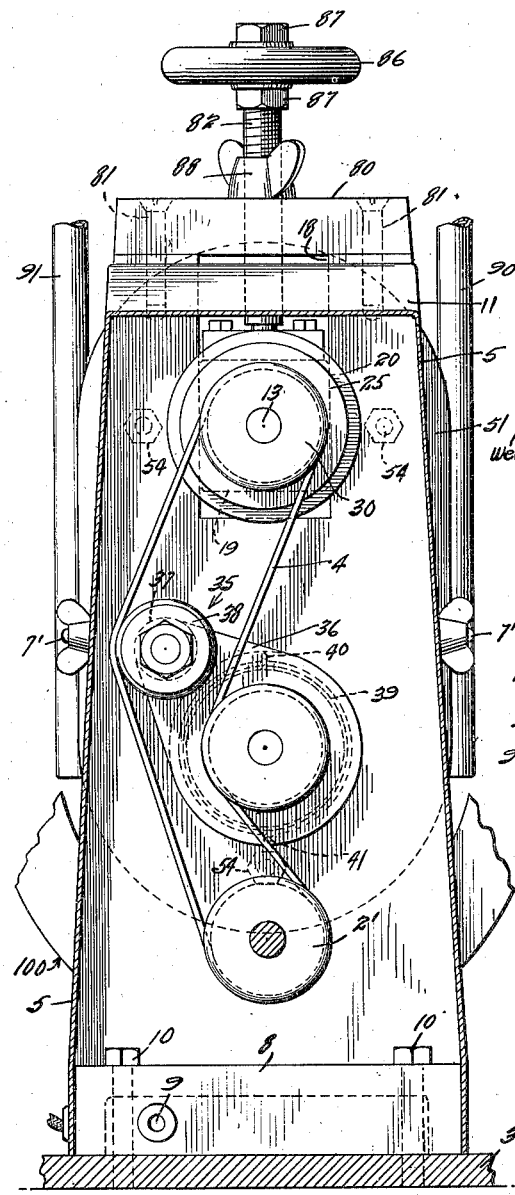
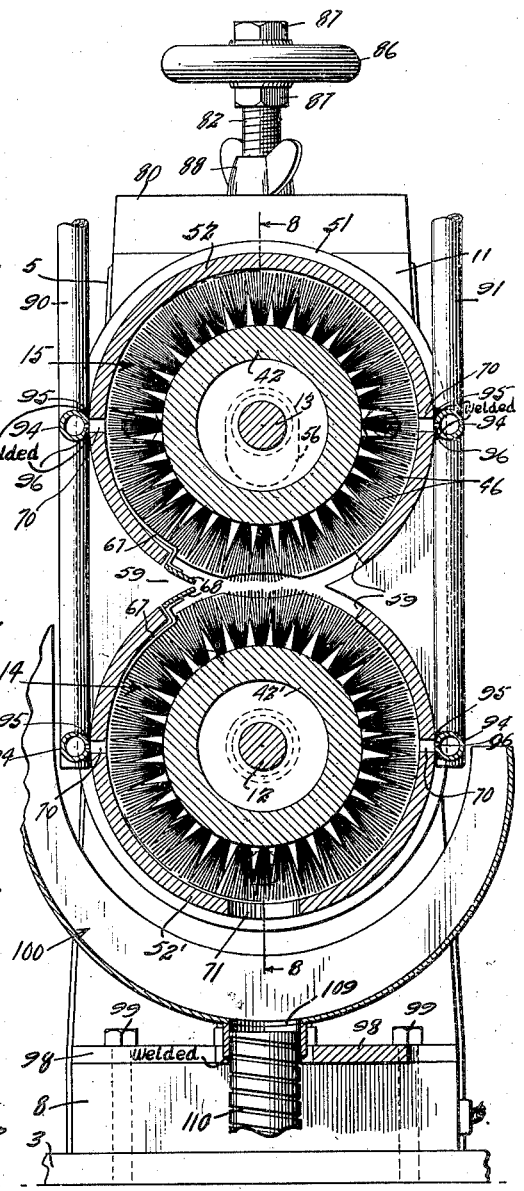
Inventors
WILLIAM V. RUSHLAU
AND VICTOR M. MICHAELS
By Semmes & Semmes
Attorneys

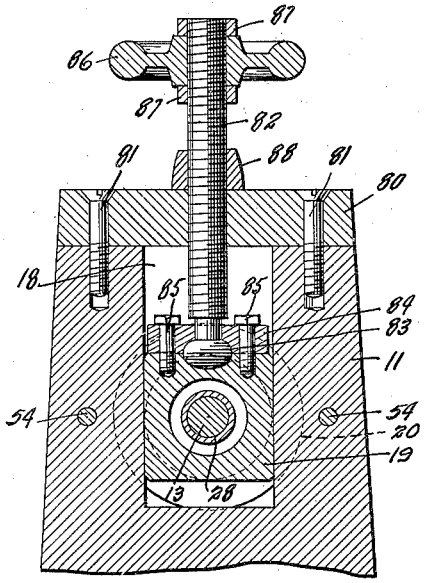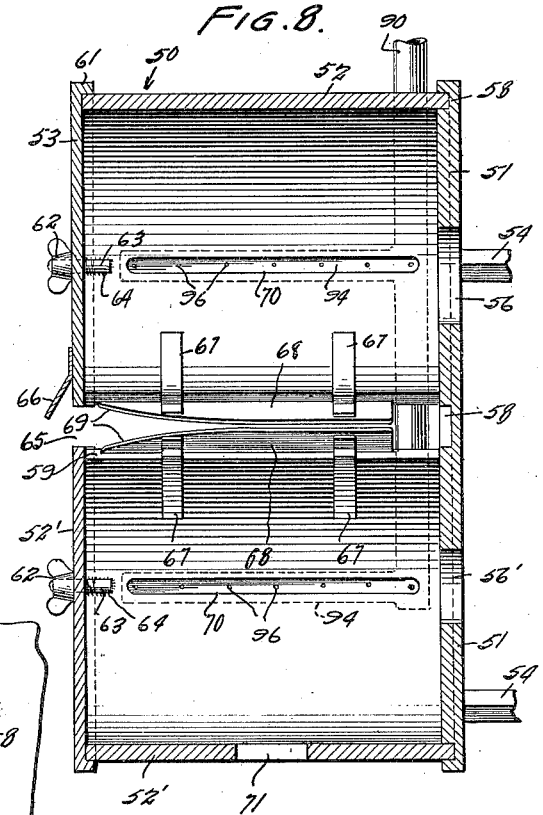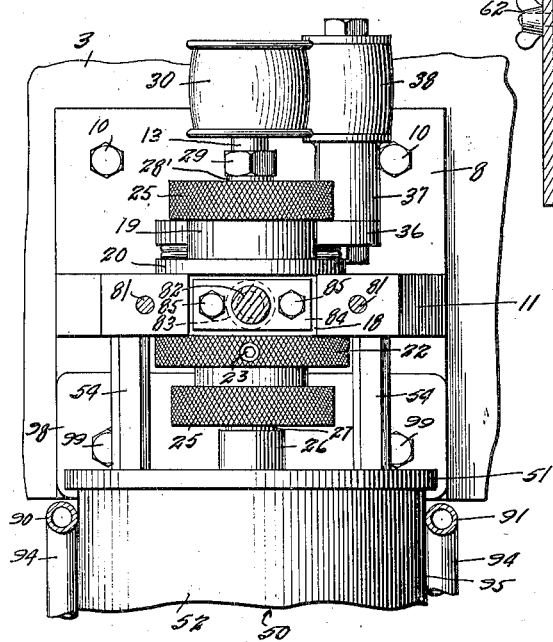

Patented Aug. 9, 1938

2,126,506

UNITED STATES PATENT OFFICE 2,126,506

CASING CLEANING AND FATTING MACHINE

William V. Rushlau and Victor M. Michaels, Omaha, Nebr.

Application August 1, 1936, Serial No. 93,898

2 Claims. (Cl. 17—43)

This invention relates to the preparation of intestines and especially has reference to a machine for removing the fat from the exterior of intestines.

The use of animal intestines has long been recognized in the art, and a variety of machines have been developed for preparing the intestines for such uses. During this preparation, the interior material, which is in the nature of a mucous membrane, is loosened and scraped from the interior of the intestine. The exterior material, which is generally fat, adheres rather tenaciously.

While certain apparatus in the prior art are designed to remove the exterior fat from intestines, there is as yet no device which, by reason of its compactness, ease of operation and special construction, is adapted to economically receive an intestine which has already been defatted and remove whatever fat may still be clinging to the exterior of the intestine. This is important, as all the fat should be removed to turn out a satisfactory casing.

A major object of this invention is to provide a machine which is compact and easy to operate for removing fat from the exterior of intestines.

Another object of this invention is to provide a machine for removing the fat from the exterior of intestines which may still adhere to the intestine after a previous defatting operation.

Yet another object of this invention is to provide a machine into which an intestine is fed against the rotation of brushes.

Still another object of this invention is to provide a machine which is provided with means to thoroughly wash away the particles of fat or other material removed by the action of the brushes.

A further object of this invention is to provide suitable guards to protect the operator from spray thrown by the brushes.

With these and other objects in view which may be incident to our improvements, the invention consists in the parts and combinations to be hereinafter set forth and claimed, with the understanding that the several necessary elements comprising our invention may be varied in construction, proportions and arrangement without departing from the spirit and scope of the appended claims.

The present invention resides in the construction of a machine for removing fat and other undesirable matter from the exterior of animal intestines, especially from beef and hog bungs, rounds, middles, as well as sewed, cut or tied casings. The present invention effects this removal by means of a pair of power driven rotary brushes. The intestine is drawn through the machine against the rotation of the brushes and while being defatted is thoroughly washed by the water which is churned to a fine spray by the rotation of the brushes.

In order to make our invention clearly understood, we have shown in the accompanying drawings means for carrying the same into practical effect, without limiting the improvements in their application to the particular constructions which, for the purpose of explanation, have been made the subject of illustration.

In the drawings:

Figure 1 is a view partly in elevation and partly in section illustrating a machine constructed in accordance with the present invention.

Figure 2 is a frontal view of the machine.

Figure 3 is a vertical sectional view taken on line 3—3 of Figure 2.

Figure 4 is a vertical sectional view taken on line 4—4 of Figure 1.

Figure 5 is a vertical view of the machine taken on line 5—5 of Figure 3.

Figure 6 is a vertical view of the brush adjuster taken on line 6—6 of Figure 3.

Figure 7 is a fragmental plan view.

Figure 8 is a vertical view taken on line 8—8 of Figure 5.

In Figure 1 is shown the intestine cleaner, indicated generally by the numeral 1. An electric motor 2 is mounted on a base plate 3 and is attached to the base plate by bolts 3' or other suitable means. The electric motor is also operatively attached to the mechanism of the cleaner by means of a belt 4 and a pulley 2'.

A cover 5 is provided for the motor having a plurality of louvres 6 for proper ventilation of the motor. The cover is attached to the base 3 by means of a hinge or hinges 7, by which it may be raised when it is desired to adjust the motor or belt. On the front outer edge of the cover is a slot 7" which engages a stud 7'. This stud is carried by an upright standard which will be more fully discussed later.

As best shown in Figure 3, a base 8 bored as at 9 for reception of suitable electric wiring is mounted on the base plate 3 by means of threaded bolts 10.

Supported on the base 8 is an upright standard 11 which supports the horizontal brush shafts 12 and 13.

Mounted on shafts 12 and 13 are brushes which are designated generally 14 and 15 respectively. The brushes 14 and 15 are held rigidly on their shafts by lock nuts 16 and 17 respectively.

As best shown in Figure 6, the upright standard 11 is provided with a longitudinal slot 18 at its upper end. A sleeve 19 is mounted in the slot 18 and is provided with a flange 20 adapted to bear against one side of the standard 11, as best shown in Figure 3. This sleeve is square in cross section, as indicated in Figure 6, to provide a sliding non-rotating fit in the slot 18. As shown best in Figure 3, a collar 22 provided with a set screw 23 is adapted to be screw threaded on the sleeve 19 and to bear against the side of the standard 11 opposite to that engaged by the flange 20.

At each end of the sleeve 19 are ball bearing races 24 and 24' held in the sleeve by retaining nuts 25. The shaft 13 is provided with an enlarged portion intermediately positioned as indicated by the numeral 26. Shaft 13 is journaled in the races 24 and 24'. A collar 27 is positioned between the enlarged portion 26 and the inner race of the bearing 24. A spacing collar 28 surrounding the shaft 13 is positioned between the bearings 24 and 24'. A spacing collar 28' is positioned between the inner race of the bearing 24' and a lock nut 29 which is provided to retain this bearing structure in position.

A pulley 30 is positioned on the end of shaft 13 and is locked in position by a set screw 31. This pulley carries and is driven by the belt 4.

The shaft 12 is provided with a bearing structure 32 which is similar to that just described for the shaft 13, except that this bearing structure is locked in a fixed position in the upright standard 11. Pulley 33 is mounted on the end of shaft 12 by set screw 34. The belt 4 bears against the pulley 33 to drive the shaft 12 and its corresponding brush 14.

A belt tightener designated generally by the numeral 35 comprises an arm 36 which is carried on the sleeve 19'. The free end of this arm is provided with a stub shaft 37, and there is rotatively mounted on the stub shaft a pulley 38.

A helical spring 39, one end of which is fixed in the flange 20' as at 40 and the other end being fixed in the arm 36 as indicated at 41, normally tends to swing the belt tightener 35 against the driving belt 4 to maintain tension thereon.

The brushes 14 and 15 are similar in construction, and therefore only the detailed construction of brush 15 will be described, the corresponding elements of 14 being primed. Each of these brushes comprises a cylinder 42 and end plates 43 and 44. The end plates, as shown in Figure 3, have reduced portions 45 which fit into the ends of the cylinders 42 and are held in place by pressure between nut 17 and enlarged portion 26. Radial bristles 46 are set in holes 47 drilled in the cylinder 42. The holes 47 may be aligned longitudinally of the cylinder, but the holes of one line may be staggered with respect to the holes in the adjacent line.

The brush housing is made up of a single backing member 51 which carries two frusto-cylindrical portions 52 and 52' for the brushes 15 and 14 respectively. Cylindrical portion 52 carries a front closure 53, while portion 52' carries a front closure 53'. The backing member is carried by two supports 54 mounted on the upright standard 11. Each support 54 has one end screw threaded into the upright frame 11. The other end, which extends through the back 51 of the housing, is provided with a nut 55 to hold the housing 50 in position.

The back 51 has a vertically elongated aperture 56 through which the shaft 13 passes and an annular aperture 56' through which shaft 12 passes.

In the inner edge of back 51 annular grooves 58 are provided, in which the cylindrical members 52 and 52' are fixed by welding, or any other means.

The cylindrical portions of the housing 50 are cut away as at 59, thereby affording exposed sections of the respective brushes.

The front cover plates 53 and 53' are flanged on their outer edges 61 and are held in place on the cylindrical portions 52 and 52' by means of wing nuts 62 which are screw threaded on studs 63. These studs are attached to the inner surfaces of the cylindrical portions 52 by brazing or other means as at 64.

These front closures are so shaped, as best shown in Figure 2, as to effectively close the front portion of the brush housing but to provide a space 65 through which the casing to be treated may be admitted to the brushes.

An angular splash guard 66 is attached to the upper closure 53 for the protection of the operator from the spray caused by the rotation of the brushes.

Resiliently attached to the housing 50 by means of the springs 67 are elongated splash plates 68. These plates 68 are mounted on the feed side of the housing 50 and extend angularly towards the brushes. The front ends of the plates 68 are tapered as at 69 to permit ease in initially inserting the casing between the brushes.

Each of the cylindrical portions 52 of the housing 50 is provided with slots 70, horizontally opposite each other, and which extend approximately the length of the brushes. An aperture 71 is located in the cylindrical portion 52' of the housing 50 under the lower brush, to drain the housing of water and other material.

As best shown in Figure 6, a plate 80 covers the slot 18 in the upright standard 11 and is held in position by threaded screws 81.

A threaded stem 82 is carried in a threaded aperture in the plate 80. The stem 82 has attached to its lower end a ball 83 which rests in a socket in the sleeve 19. This ball 83 is held in position by means of a keeper 84 which is retained in place by threaded bolts 85 set in sleeve 19.

A threaded hand wheel 86 is held in position on the opposite end of the stem 82 by means of threaded collars 87 which are located one on either side of the hand wheel. A lock nut 88 is also threaded on the stem 82 just above the plate 80. The rotation of the stem 82 will raise or lower the shaft 13.

As best shown in Figure 2, a pair of vertical water pipes 90 and 91 are arranged on either side of the housing 50. If desired, these pipes may carry water of different temperatures. The volume of water passing through these pipes from any suitable source is controlled by the valves 92 and 93 which may be of any suitable type.

As best shown in Figure 5, both pipes have branches 94 opposite the slots 70. The branch pipes 94 extend longitudinally of the cylindrical portions 52 of the housing 50 and are welded to them as shown at 95.

As best shown in Figure 8, each branch pipe 94 contains fine spray holes 96 which communicate with the interior of the housing through the slots 70. By this means water is sprayed into the housing upon the rotary brushes.

Referring to Figure 3, there is attached to the base 8 at the foot of the upright standard 11 a bracket 98. This bracket is attached to the base by means of threaded bolts 99 which are inserted in apertures in the base 8 and fitted into threaded sockets in the base plate 3.

A drain box, designated generally by the numeral 100, is provided to catch and collect the water and removed fat and debris resulting from the operation of the device. This drain box consists of a base member 101, which extends under the housing 50 and upwardly about the cylindrical portion 52'. The base plate 101 is projected to form an apron member 102 and thence vertically bent to form an end wall 103. Side members 104 and 105 are provided which extend the length of the base plate 101 and apron 102. It will be noted that the side members 104 and 105 are cut away as at 106 to follow the shape of the cylindrical portion 52'. That portion of side member 105 extending along the apron 102 is cut down as at 107 to facilitate feeding of the casing to the machine. The side member 104 may be continued to a greater height to furnish additional shielding 108.

It will therefore be observed that the drain box 100 serves to collect the water and other material that results from the operation of the device. The material collected in the drain box is discharged through an opening 109 and passes into discharge conduit 110.

The drain box is removably attached to the bracket 98 by means of bolts 111 welded to the boxes at 112 to form a water tight fit. Wing nuts 113 are screw threaded on bolts 112 to hold the drain box in its fixed position and whereby the box may be readily removed for cleaning.

Space blocks 114 are provided to regulate the height of the drain box and to prevent vibration.

A light standard 120 is mounted upon the base 3 in any suitable manner and carries a flexible branch 121 which supports a light socket and bulb 122. The light may thus be adjusted by the flexible branch to any angle over the brush housing or the motor which may be convenient to the operator.

From the above description it can be readily seen that the motor 2 drives the belt 4 which in turn rotates the shafts 12 and 13 by means of pulleys 30 and 33. The pair of brushes 14 and 15, rigidly mounted on the shafts 12 and 13, rotate in the same direction as the shafts.

The belt tightener 35, mounted upon the sleeve 19', is held against the belt by means of a spring 36 and serves to maintain the belt taut.

The method of operating the machine is believed to be obvious from the foregoing. In practice, the upper brush is adjusted by means of hand wheel 86 until the brushes are the proper distance apart to accommodate the thickness of the casing or to allow for light or heavy brush action.

The motor 2 is then started, setting the mechanism in motion, and an intestine to be defatted is fed into the machine through the slotted opening in the brush housing 65 between the brushes 14 and 15 and against their direction of rotation.

With one hand the operator spreads out or flattens the casing as it is being pulled between the brushes by his other hand. As the casing passes between the brushes, a scrubbing and scraping action is applied to both the top and bottom of the casing.

The water sprayed on both sides of both brushes through the slots 70 washes away all the material removed by the action of the brushes. This material is carried by the water through aperture 71 in the bottom of the housing 50 and the aperture 109 in the bottom of the drain box 100 and into the drain pipe 110.

Guard 66 is mounted on the front housing cover 53 in such a manner as to protect the operator from the spray thrown by the rotation of the brushes. The guard plates 68 are mounted in such a manner that they partly close the feeding end of the opening 65 and tend to keep the spray inside the housing.

After the casing has been fed between the brushes, it may be reversed in the hands of the operator and fed through a second time.

Pipes 90 and 91, which supply the housing with water by means of branch pipes 94 which are fitted to slots 70, may carry water at different temperatures, which is later mixed by the rotation of the brushes. However, if desired, the temperature of the water may be regulated before it enters the pipes 90 and 91, in which case these pipes would carry water of the same temperature. In either case, the volume of water may be regulated by means of valves 92 and 93.

From the foregoing description it will be appreciated that we have provided a machine for removing the exterior fat from entrails in a very satisfactory manner. For several reasons it is especially adapted for refinishing casings which have been previously defatted by another machine.

In the first place, the fine adjustment that can be obtained between the brushes not only allows the machine to defat any size intestine, but also provides for either a light or heavy scrubbing action of the brushes. This is important, because the treatment of previously defatted casings may vary according to the amount of success obtained in the first operation.

Secondly, this machine is adapted to give the casing a thorough washing, thus producing a finished product of good appearance.

Thirdly, by enabling the operator to feed the intestine into the machine against the rotation of the brushes, a superior scrubbing effect may be obtained.

If desired, a set of rotary scrapers may be substituted in place of the rotary brushes.

While we have described the preferred arrangement and construction of the machine, we wish it understood that we do not confine ourselves to the precise details herein set forth by way of illustration, as it is apparent that many changes may be made by those skilled in the art without departing from the spirit of the invention or the scope of the appended claims.

We claim:

1. In a machine for removing the fat from the exterior of entrails, the combination of a pair of vertically spaced brushes, a cylindrical housing provided for each brush, slots in each housing, a water pipe attached to each slot having apertures in the side of the pipe adjacent the slot, opposed sides of each housing being cut to form an opening for the introduction and removal of the entrails, a pair of guards one on either side of the opening, another guard mounted on one of the housings and projecting partly over the opening, and a pan situated under the bottom housing.

2. In a machine for removing fat from the exterior of entrails, the combination of a pair of vertically spaced rotary brushes, the upper brush being adjustable vertically, a substantially cylindrical housing provided for each brush, a pair of longitudinally extending slots in each housing on opposite sides of its respective brush, a water pipe attached to each slot having apertures in the side of the pipe adjacent the slot, the bottom of the top housing being cut away and the top of the lower housing being cut away to form an opening for the introduction and removal of the entrails, a pair of guards at the inlet side of the opening, one on either side of the opening and each being mounted on opposite housings, another guard mounted on one of the housings and projecting partly over the opening, and a pan situated under the lower housing having a drain and a laterally extending apron.

WILLIAM V. RUSHLAU.
VICTOR M. MICHAELS.